Sept. 11, 1945.  W. G. BALDENHOFER  2,384,590
LUBRICATING SYSTEM FOR MACHINE TOOLS
Filed Jan. 22, 1942   2 Sheets-Sheet 1

INVENTOR
WILLIAM G. BALDENHOFER
BY
ATTORNEY

Sept. 11, 1945.  W. G. BALDENHOFER  2,384,590
LUBRICATING SYSTEM FOR MACHINE TOOLS
Filed Jan. 22, 1942  2 Sheets-Sheet 2

INVENTOR
WILLIAM G. BALDENHOFER
BY Toulmin & Toulmin
ATTORNEYS

Patented Sept. 11, 1945

2,384,590

UNITED STATES PATENT OFFICE 2,384,590

LUBRICATING SYSTEM FOR MACHINE TOOLS

William G. Baldenhofer, Springfield, Ohio, assignor to The Thompson Grinder Company, Springfield, Ohio, a corporation of Ohio Application January 22, 1942, Serial No. 427,776

13 Claims. (Cl. 184—6)

This invention relates to lubricating systems for machine tools, and more particularly deals with a lubricating system automatically controlled whereby the tool is held inoperative until a suitable lubricating pressure and flow of lubricant has been established on the ways of the tool.

As is well known to those skilled in the art to which this invention appertains, it frequently happens that a machine tool is placed in operation before the ways are properly lubricated with the result that excessive wear takes place and the accuracy of the tool is thereby adversely affected.

It is the primary purpose of my invention to provide means whereby the starting mechanism of a machine tool is made dependent on the lubricating system in order that the several elements of the machine tool requiring lubrication be prelubricated and thus conditioned for operation before the starting mechanism of the machine tool is brought into operative position.

This is brought about by interconnection of the pressure lubricating system of the machine tool and the starting mechanism thereof. As will be noted from the description hereinafter, my invention may be practiced with a simple and inexpensive arrangement of parts, but, nevertheless is foolproof in operation and gives the machine tool a degree of protection against dry running hitherto considered unattainable.

The system of my invention is applicable to numerous types of machine tools and other appliances where thoroughness and constancy of lubrication are desirable or advantageous and where failure properly to lubricate friction members will lead to excessive wear, lack of accuracy and shortened service life.

According to my invention, it is impossible for the machine tool to be placed in operation until a sufficient predetermined pressure and flow of lubricant have been established upon the ways, whereupon the source of motive power for the machine tool is placed in operative condition.

Figure 1:
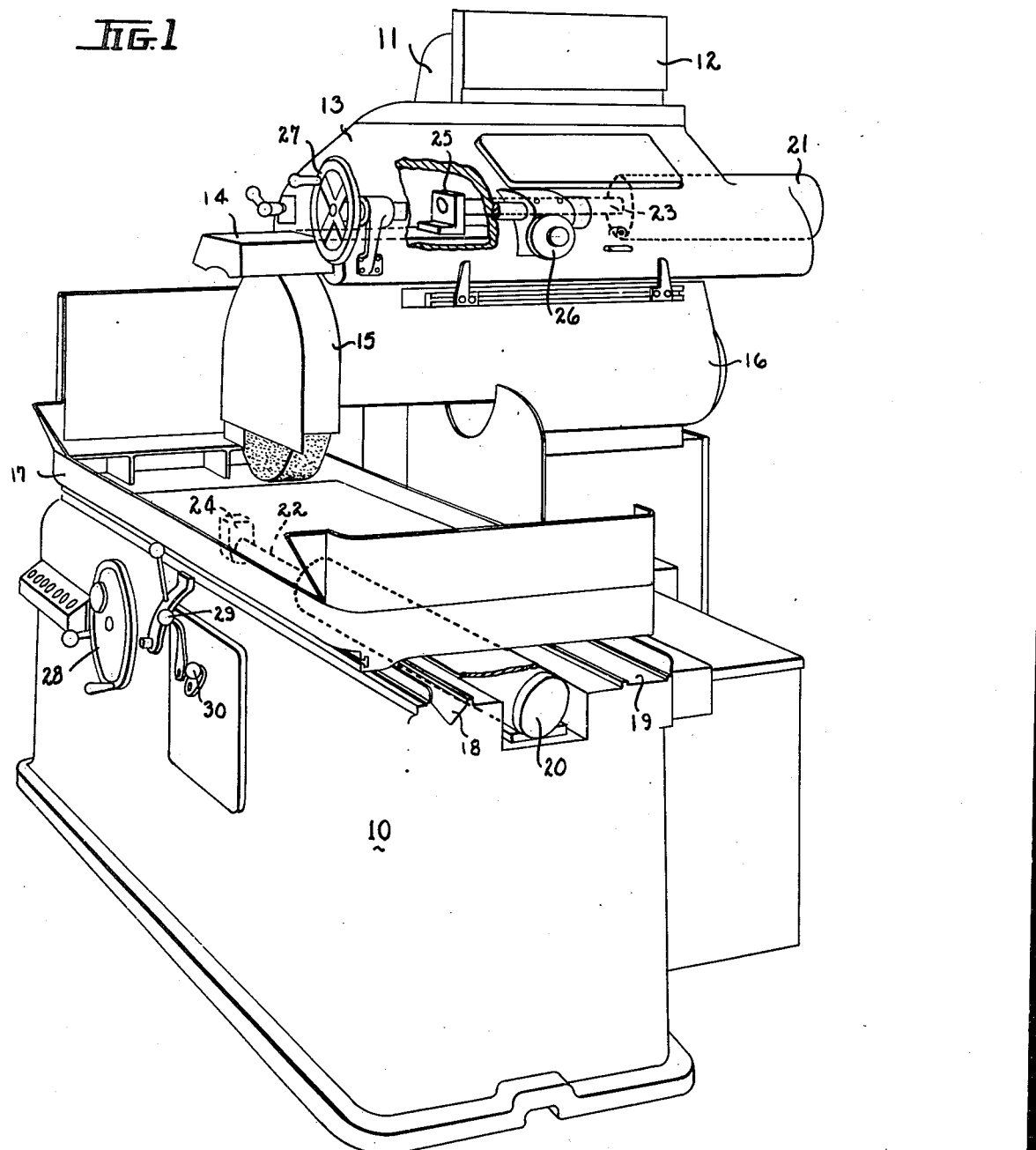
Figure 2:
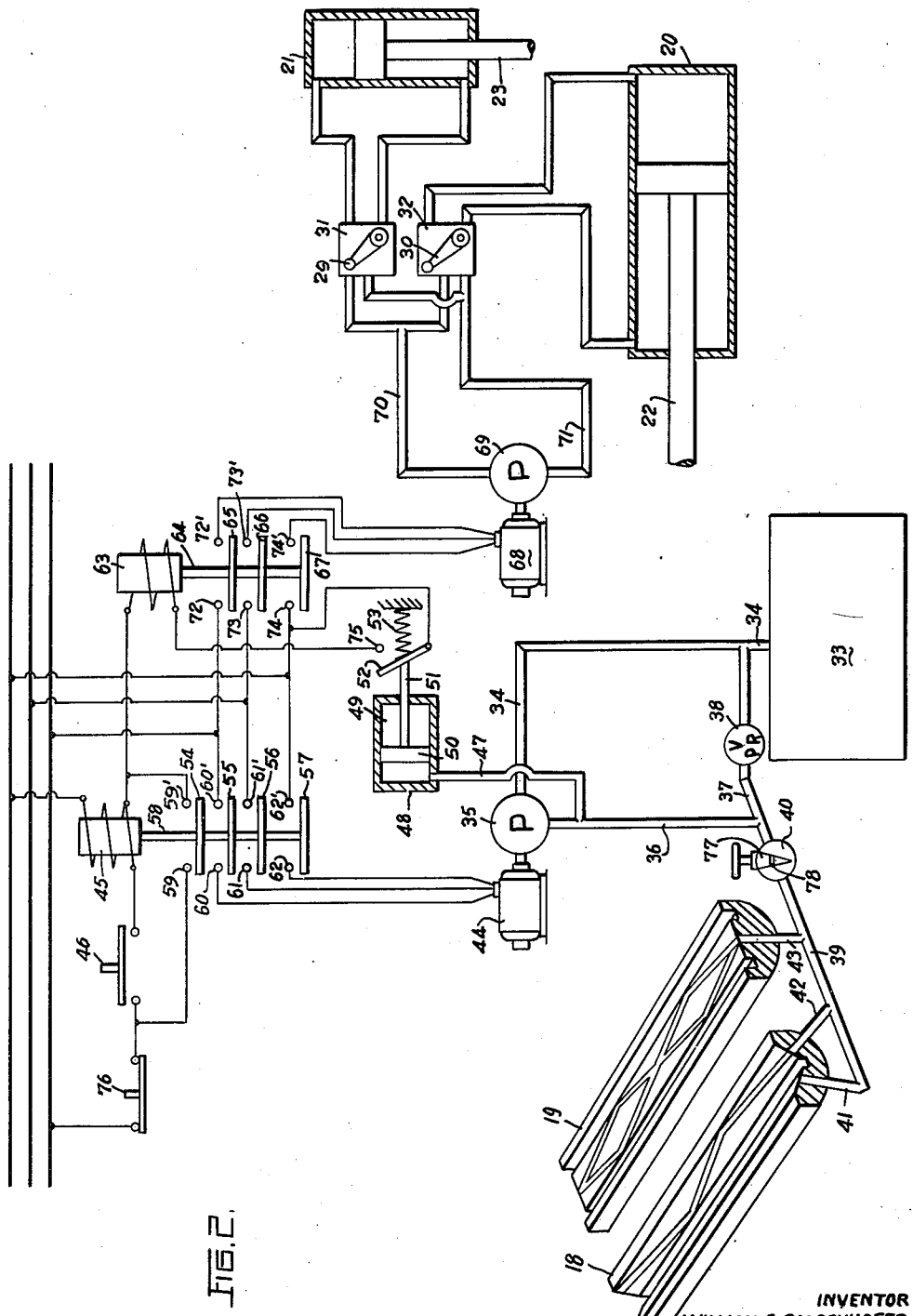

My invention will be more fully understood by reference to the following description taken in connection with the annexed drawings in which:

Fig. 1 is a perspective view, partly broken away, of a machine tool, more specifically a surface grinder; and Fig. 2 is a diagrammatic view of the control system which is the subject matter of the present invention.

Referring to Fig. 1, 10 is the bed of a surface grinder, 11 is a column, 12 is the slide of the column, 13 is the saddle, 14 is the dovetail cross slide, 15 is the grinder head, 16 is the spindle head, 17 is the table, 18 and 19 are the ways, 20 and 21 are hydraulic cylinders, 22 and 23 are the corresponding plungers and 24 and 25 are brackets attached, respectively, to the plungers 22 and 23.

Still referring to Fig. 1, 26 is a clutch adapted to engage the handwheel 27 with a rack (not shown), whereby the spindle head 16, grinder head 15, and dovetail slide 14 may be actuated by moving the handwheel 27 instead of being moved by pressure in the hydraulic cylinder 21. Handwheel 28 is for the purpose of elevating the saddle 13. The hand levers 29 and 30 operate, respectively, the 4-way valves 31 and 32 (see Fig. 2).

Referring now to Fig. 2, 33 is a lubricant storage tank connected by line 34 with a pump 35. The pump 35 discharges through a line 36 which is connected with line 34 by a by-pass 37 provided with a relief valve 38. Line 36 is also connected with a line 39 provided with a needle valve 40 and with ducts 41 and 42 connected to the way 18 and duct 43 connected to the way 19.

The pump 35 is driven by a motor 44 which is actuated by a magnetic starter 45 which is energized by closing a starting push button 46. The discharge line 36 from the pump 35 is provided with a branch line 47 connected with a pressure switch 48. The pressure switch 48 comprises a cylinder 49, piston 50 and rod 51 attached to the piston 50. A contact blade 52 is made to bear against the rod 51 by spring 53, the contact blade 52 remaining in the open position so long as no pressure is imposed on piston 50 by the flow of lubricant through line 47 into the lower portion of cylinder 49 of pressure switch 48.

When the magnetic starter 45 is energized by closing the starting switch 46 the contact blades 54, 55, 56 and 57 attached to the rod 58 of magnetic starter 45 are caused to travel upwardly and to contact, respectively, the contact points 59, 59', 60, 60', 61, 61', 62 and 62', whereby the corresponding circuits are closed. A second magnetic starter 63 provided with rod 64 and contact blades 65, 66 and 67 is adapted to actuate the motor 68, driving pump or compressor 69 which is connected by ducts 70 and 71, and valves 31 and 32 with cylinders 20 and 21. When the magnetic starter 63 is energized the contact blades 65, 66 and 67 mounted on rod 64 are caused to travel upwardly and establish contact, respectively, between contact points 72 and 72', 73 and 73', 74 and 74', thereby placing the motor 68 and pump or compressor 69 in motion and delivering fluid through ducts 70 and 71 and valves 31 and 32 into the cylinders 20 and 21; however, the magnetic starter 63 is not energized until pressure has been applied on piston 50 of pressure switch 48, whereby the rod 51 is caused to travel outwardly against the spring 53, thereby causing contact of blade 52 with contact point 75, thus completing the circuit.

It is thus seen that when push button switch 46 is closed and the magnetic switch 45 energized, the motor 44 and pump 35 are placed in motion, thereby causing lubricant from the tank 33 to flow through lines 34 and 36, needle valve 40, line 39 and ducts 41, 42 and 43 into the ways 18 and 19. When the lubricant discharged by pump 35 has built up sufficient pressure it begins to flow through line 47 into cylinder 49 of pressure switch 48 and when the pressure within the cylinder 49 is sufficient to overcome the tension of spring 53, the piston 50 of pressure switch 48 carrying rod 51 and contact blade 52 travels forwardly and the blade 52 engages contact point 75, thus completing the circuit which energizes the magnetic starter 63, which then places in motion the motor 68 and pump or compressor 69 which move fluid through lines 70 and 71 and valves 31 and 32 of the cylinders 20 and 21 placing them in motion. Therefore, it is impossible for the cylinders 20 and 21 to operate until a suitable predetermined lubricant pressure has been established and lubrication of the ways 18 and 19 has been effected.

It will be understood by those skilled in the art that failure of motor 44 and/or pump 35 for any reason will release the pressure in cylinder 49 of pressure switch 48, whereby the spring 53 pressing against the contact blade 52 and the rod 51 will cause the piston 50 to travel inwardly, thus breaking the contact between blade 52 and contact point 75, de-energizing the magnetic starter 63 and stopping the flow of current to motor 68, thus immediately stopping the flow of fluid from pump or compressor 69 through lines 70 and 71 and valves 31 and 32 into cylinders 20 and 21, which are thus rendered inoperative.

It will be also understood that the entire system may be stopped at will by actuating the push button switch 76, thus de-energizing the magnetic starter 45 which will thus disrupt the flow of current to motor 44 and bring about the stoppage of pump 35. As soon as pump 35 stops the pressure on line 47 will drop, thus permitting the spring 53 to move the contact blade 52, rod 51 and piston 50 inwardly in pressure switch 48. This de-energizes the magnetic starter 63 and causes immediate stoppage of the motor 68 and pump or compressor 69 and therethrough also causes the stoppage of plungers 22 and 23 actuated by cylinders 20 and 21, respectively.

It will be noted that the wedge 77 of the needle valve 40 is provided with annular channel 78, the purpose of which is to maintain flow of lubricant through the needle valve even when the needle valve is fully closed. This acts as a safeguard against the possibility of pressure being built up in lines 36 and 47 which would result in actuation of the pressure switch 48 and the magnetic starter 63 and the placing of motor 68, pump or compressor 69 and plungers 22 and 23 in motion without lubricant flowing onto the ways 18 and 19 while the needle valve 40 was fully closed. The needle valve 40 is placed on the line 39 for the purpose of regulating the flow of oil onto the ways 18 and 19, but as mentioned above, oil will flow to the ways, although in limited amount, even when the needle valve 40 is fully closed.

From the above description and the annexed drawings, it will be fully understood by those skilled in the art that the control of my invention is foolproof in operation and that it insures full and proper lubrication of the ways before the operative members of the machine tool are placed in motion.

It will be also understood that the control mechanism or system of my invention is simple in construction and comparatively inexpensive with respect to the protection it gives to the machine tool wherein it is applied. Needless to say, the mechanism or system of my invention is adapted for use in numerous types of machine tools and other appliances where thoroughness and constancy of lubrication are desirable or advantageous and where failure properly to lubricate friction members will lead to excessive wear, lack of accuracy and shortened serviceable life.

While I have described and illustrated certain specific embodiments of my invention, I want it understood that it is not my intention to have my invention limited to or circumscribed by the specific details of construction, arrangement of parts, or procedure herein described and illustrated inasmuch as my invention is adapted to numerous changes depending on local conditions and individual preference without departing from the spirit thereof and the scope of the appended claims.

I claim:

1. A lubricating system comprising: means for delivering lubricant at desired points in open circuit; flow controlling and pressure establishing means in the delivery line of said lubricant delivery means said flow controlling and pressure establishing means being connected intermediate said delivery means and said desired points; switch means adapted to be actuated by pressure established by said pressure establishing means in said delivery means and connected thereto; and fluid handling means actuated by said switch adapted to control the movement of operative elements; whereby lubricant pressure and flow are established at desired points before said operative elements are placed in motion.

2. A lubricating system comprising: a pump for delivery of lubricant under pressure to the ways of a machine tool in open circuit; flow controlling and pressure establishing means in the delivery line of said pump said flow controlling and pressure establishing means being connected intermediate said pump and said ways; a fluid pressure operated switch adapted to be actuated by pressure established by said pressure establishing means in the delivery line of said pump and connected thereto; and fluid handling means actuated by said switch adapted to control the movement of elements reciprocable on said ways; whereby lubricant pressure and flow are established on the ways before the elements thereon are placed in motion, thereby insuring prelubrication and controlling excessive wear.

3. A lubricating system comprising: a source of lubricant; a pump adapted to deliver lubricant under pressure from said source to desired points in open circuit; flow controlling and pressure establishing means in the delivery line of said pump; a by-pass from said pump delivery line to said source of lubricant, said by-pass being connected to said pump delivery line intermediate the pump discharge and said flow regulating means; pressure relief means in said by-pass; fluid pressure switch means adapted to be actuated by pressure in the pump delivery line and connected thereto; and fluid handling means actuated by said switch adapted to control the movement of operative elements; whereby lubricant pressure and flow are established at desired points before said operative elements are placed in motion.

4. In a machine tool in combination: means for delivering lubricant under pressure at desired points in open circuit; flow controlling and pressure establishing means in the delivery line of said lubricant delivery means said flow controlling and pressure establishing means being connected intermediate said lubricant delivery means and said desired points; switch means adapted to be actuated by pressure established by said pressure establishing means in said delivery means and connected thereto; and fluid handling means actuated by said switch adapted to control the movement of operative elements in said machine tool; whereby lubricant pressure and flow are established at desired points before said operative elements are placed in motion.

5. In a machine tool in combination: a pump for delivery of lubricant under pressure to the ways of said machine tool in open circuit; flow controlling and pressure establishing means in the delivery line of said pump said flow controlling and pressure establishing means being connected intermediate said pump and said ways; a fluid pressure operated switch adapted to be actuated by pressure established by said pressure establishing means in the delivery line of said pump and connected thereto; and fluid handling means actuated by said switch adapted to control the movement of elements reciprocable on said ways; whereby lubricant pressure and flow are established on the ways before the elements thereon are placed in motion, thereby insuring prelubrication and controlling excessive wear.

6. The combination with a machine tool of a lubricating system comprising: means for delivering lubricant under pressure at desired points; flow controlling and pressure establishing means in the delivery line of said lubricant delivery means said flow controlling and pressure establishing means being connected intermediate said delivery means and said desired ways; switch means adapted to be actuated by pressure established by said pressure establishing means in said delivery means and connected thereto; and fluid handling means actuated by said switch adapted to control the movement of operative elements in said machine tool; whereby lubricant pressure and flow are established at desired points before said operative elements are placed in motion.

7. The combination with a machine tool of a lubricating system comprising: a pump for delivery of lubricant under pressure at desired points; flow controlling and pressure establishing means in the pump delivery line; a fluid pressure operated switch actuated by pressure in the pump delivery line and connected thereto; fluid handling means actuated by said switch adapted to control the movement of operative elements in said machine tool; whereby lubricant pressure and flow are established at desired points before said operative elements are placed in motion.

8. The combination with a machine tool of a lubricating system comprising: a pump for delivery of lubricant under pressure to the ways of said machine tool; flow controlling and pressure establishing means in the delivery line of said pump said flow controlling and pressure establishing means being connected intermediate said pump and said ways; a fluid pressure operated switch adapted to be actuated by pressure established by said pressure establishing means in the delivery line of said pump and connected thereto; and fluid handling means actuated by said switch adapted to control the movement of elements movable on said ways; whereby lubricant pressure and flow are established on the ways before the elements thereon are placed in motion; thereby insuring prelubrication and controlling excessive wear.

9. A starting system for a machine tool comprising in combination: a source of power; motor means adapted to be driven by said power; lubricant delivery means driven by said motor adapted to deliver lubricant under pressure at desired points in said machine tool; flow controlling and pressure establishing means in the delivery line of said lubricant delivery means; switch means adapted to be actuated by pressure in said delivery means and connected thereto; and fluid handling means actuated by said switch adapted to control the movement of operative elements in said machine tool; whereby lubricant pressure and flow are established at desired points before said operative elements are placed in motion, thereby preventing dry running of said machine tool.

10. A starting system for a machine tool comprising in combination: a source of power; motor means adapted to be driven by said power; a pump driven by said motor adapted to deliver lubricant under pressure to the ways of said machine tool; flow controlling and pressure establishing means in the delivery line of said pump said flow controlling and pressure establishing means being connected intermediate said pump and said ways; a fluid pressure operated switch adapted to be actuated by pressure established by said pressure establishing means in the delivery line of said pump and connected thereto; and fluid handling means actuated by said switch adapted to control the movement of elements movable on said ways; whereby lubricant pressure and flow are established on the ways before the elements thereon are placed in motion, thereby preventing dry running of said machine tool.

11. A lubricating system for the bearing surfaces of reciprocating parts of machine tools comprising a lubricant reservoir, a conduit leading from said reservoir to said bearing surfaces, an impeller in said conduit operating to force lubricant under pressure from said reservoir to said surfaces, a motor connected to move said reciprocating parts, switch means controlling the operation of said motor, pressure responsive means operating said switch to close the same only in response to a predetermined pressure, said responsive means being connected to said conduit at a first point between said impeller and surfaces, and a pressure-reducing and flow-controlling device in said conduit between said first point and said surfaces.

12. In combination with the reciprocating part of a machine tool and the bearing surfaces therefor, a power means connected to reciprocate said part, pressure responsive switch means connected to control the operation of said power means, a conduit connecting said reservoir to said bearing surfaces, an impeller in said conduit operating to force lubricant from said reservoir to said surfaces, said switch means being connected to said conduit at a first point between said impeller and said surfaces, and a pressure-reducing and flow controlling device in said conduit between said first point and said surfaces.

13. A lubricating system for the bearing surfaces of reciprocating parts of machine tools comprising a lubricant reservoir, a conduit leading from said reservoir to said bearing surfaces, an impeller in said conduit operating to force lubricant under pressure from said reservoir to said surfaces, a motor connected to move said reciprocating parts, switch means controlling the operation of said motor, pressure responsive means operating said switch to close the same only in response to a predetermined pressure, said responsive means being connected to said conduit at a first point between said impeller and surfaces, a pressure-reducing and flow-controlling device in said conduit between said first point and said surfaces, power means driving said impeller, a source of power, a relay adapted to be operated to connect said source of power to drive said power means, a second relay connected to control said motor, and a line controlling operation of said second relay, said switch means being connected in said line.

WILLIAM G. BALDENHOFER.